(12) United States Patent
Toyoshima

(10) Patent No.: US 7,031,451 B1
(45) Date of Patent: Apr. 18, 2006

(54) ELECTRONIC APPARATUS AND MULTI-FUNCTIONAL TELEPHONE APPARATUS

(75) Inventor: Fumiyoshi Toyoshima, Tokyo (JP)

(73) Assignee: NEC Infrontia Corporation, Kawasaki (JP)

( * ) Notice: Subject to any disclaimer, the term of this patent is extended or adjusted under 35 U.S.C. 154(b) by 795 days.

(21) Appl. No.: 09/619,893

(22) Filed: Jul. 19, 2000

(30) Foreign Application Priority Data

Jul. 22, 1999 (JP) ................................. 11-207344

(51) Int. Cl.
*H04M 3/00* (2006.01)

(52) U.S. Cl. .......................... 379/352; 379/914; 700/83

(58) Field of Classification Search ................ 379/352, 379/974, 975; 345/853, 854; 703/7
See application file for complete search history.

(56) References Cited

U.S. PATENT DOCUMENTS

| | | | | |
|---|---|---|---|---|
| 4,291,198 A | * | 9/1981 | Anderson et al. | 379/93.17 |
| 4,864,601 A | * | 9/1989 | Berry | 379/93.07 |
| 5,086,385 A | * | 2/1992 | Launey et al. | 700/83 |
| 6,002,854 A | * | 12/1999 | Lynch et al. | 703/1 |

FOREIGN PATENT DOCUMENTS

| | | |
|---|---|---|
| JP | 58-194490 | 11/1983 |
| JP | 61-13898 | 1/1986 |
| JP | 2-238757 | 9/1990 |
| JP | 2-49078 | 10/1990 |
| JP | 6-54361 | 2/1994 |
| JP | 6-120893 | 4/1994 |
| JP | 9-233161 | 9/1997 |

\* cited by examiner

*Primary Examiner*—Sinh Tran
*Assistant Examiner*—Walter F Briney, III
(74) *Attorney, Agent, or Firm*—Dickstein, Shapiro, Morin & Oshinsky, LLP.

(57) ABSTRACT

An electronic apparatus and a multi-functional telephone apparatus in which system data can be set efficiently using plural pictures irrespective of whether the setting is new A relevant information table unit 141 includes a menu table 142 for demonstrating a menu for setting a multi-functional telephone apparatus on a display, not shown, plural data-related tables 143 for demonstrating constituent elements for each setting and a system data table 144 for demonstrating the contents of respective system data. The three tables 142 to 144 are related to one another by a pointer 145. Thus, a desired item is selected from the menu, and a desired SDID is selected from the groups displayed in the data-related tables 143 lying on its lower order side to set corresponding system data.

1 Claim, 19 Drawing Sheets

FIG. 3

(SYSTEM DATA)

| | |
|---|---|
| $SDID_1$ | H/W REGISTRATION |
| $SDID_2$ | REGISTER LINE WIRE TO A TELEPHONE SET BUTTON |
| $SDID_3$ | CALL SOUND VOLUME CONTROL |
| $SDID_4$ | REGISTRATION OF DIAL TYPE (DP/PB) |
| $SDID_5$ | REGISTRATION OF CALLING PARTY NUMBER DEMONSTRATING TELEPHONE SET |
| $SDID_6$ | NAME CALLING PARTY NUMBER CHANGED? |
| $SDID_7$ | NAME REGISTRATION FOR CALLING PARTY NUMBER |
| $SDID_8$ | NUMBER OF SIGNIFICANT DIAL-IN DIGITS |
| $SDID_9$ | CORRELATION BETWEEN DIAL AND TELEPHONE SET NUMBER |
| ... | ... |

| |
|---|
| H/W FOR ISDN NETWORK |
| H/W FOR ANALOG NETWORK FOR NOTIFICATION OF CALLING PARTY NUMBER |
| H/W FOR DIAL-IN ACCOMMODATING ANALOG NETWORK |
| H/W FOR ORDINARY ANALOG NETWORK |
| H/W FOR DIGITAL MULTI-FUNCTIONAL TELEPHONE APPARATUS |
| H/W FOR ANALOG TELEPHONE SET |
| H/W FOR DOOR-PHONE |
| H/W FOR CONNECTION TO EXTERNAL EQUIPMENT (SPEAKER, SOUND SOURCE ETC) |
| H/W FOR SPEECH ACCUMULATION |
| H/W FOR VOICE MAIL |
| H/W FOR HAND-FREE |
| H/W FOR MANAGEMENT OF TALK FEE |
| H/W FOR RECEPTION OF PB SIGNAL |
| ... |

| DISPLAY OF CALLING PARTY NUMBER |
| DIAL-IN |
| AUTOMATIC STATION SELECTION AND TRANSMISSION |
| TRANSMISSION OVER SPECIFIED LINE WIRE |
| RE-TRANSMISSION |
| AUTOMATIC RE-TRANSMISSION |
| STOCK DIAL |
| SAVE DIAL |
| SHORTCUT DIAL |
| LINE WIRE TRANSMISSION RULE |
| NOT DIAL-IN |
| RECEPTION NUMERAL CONVERSION |
| LINE WIRE TERMINATION SOUND DESIGNATION |
| AUTOMATIC STATION SELECTION RESPONSE |
| SEQUENTIAL TERMINATION DISTRIBUTION |
| CONFERENCE CALL |
| LINE WIRE TRANSMISSION |
| ABSENCE SETTING |
| CALL RESERVED |
| TENANT SETTING |
| GROUP CALL-OUT |
| DOOR-PHONE |
| HANDS-FREE CALL |
| VOICE MAIL SERVICE |
| CALL RECORDING |
| FUNCTION REGULATING CLASS |
| BGM BROADCAST |
| CALL FEE DISPLAY |
| ⋮ |

ELECTRONIC APPARATUS AND MULTI-FUNCTIONAL TELEPHONE APPARATUS

FIELD OF THE INVENTION

This invention relates to an electronic apparatus and a multi-functional telephone apparatus capable of setting or modifying the hardware or functions of various apparatus. More particularly, it relates to an electronic apparatus and multi-functional telephone apparatus capable of setting or modifying the apparatus extremely readily.

BACKGROUND OF THE INVENTION

As the communication is diversified, the telephone apparatus, such as button telephone apparatus, is intensified and variegated in function. The telephone apparatus having multiple functions is termed herein a multi-functional telephone apparatus. Also, the apparatus including the multi-functional telephone apparatus and configured for being control led using system data are collectively termed electronic apparatus. For evading abstractness in the description, however, a multi-functional telephone apparatus is explained as a specified example.

Among multi-functional telephone apparatus, a button telephone apparatus is taken as an example. A button telephone apparatus is an apparatus adapted for connecting plural button telephones to a line wire or having call over a private branch line. In installing the button telephone apparatus, a variety of functions need to be set. By way of examples, it is necessary to set a bell of which button telephone is to be rung when a telephone call is made from outside, which one of the button telephones is to be set as a telephone for a supervising personnel and which function is to be set for this telephone, or whether or not a certain button telephone is to be dedicated to a call over private branch line.

These settings, required for operation of the multi-functional telephone apparatus, is termed herein system data setting. If the multi-functional telephone apparatus is intensified in its functions, much time is consumed in system data setting when installing new apparatus or changing the setting environments. Thus, a number of proposals have been made in connection with system data setting.

For example, in JP Patent Kokai Publication JP-A-58-194490, a special system data setting apparatus having an interface equivalent to the conventional button telephone set is provided for writing system data in a button telephone apparatus. This system data setting apparatus (or operating data setting apparatus) has a storage component, such as a cassette magnetic tape, in which the system data are stored. In this proposal, this system data setting apparatus, in place of a button telephone set, can be connected to the button telephone apparatus, and is used for readily setting system data.

However, in this proposal, a dedicated system data setting apparatus needs to be provided. Also, system data memorized in a storage component, such as a cassette magnetic tape in this system data setting apparatus, is used. Consequently, such a problem is raised that, whilst the proposal is convenient when typical system data is used, difficulties are encountered in connection with flexible accommodation to individual systems.

FIG. 16 shows another proposal pertinent to system data setting. In this proposal, shown in JP Patent Kokai Publication JP-A-61-13898, the multi-functional telephone apparatus includes discriminating means 11 and processing means 12. The discriminating means 11 is adapted for inputting system data 13 and the registration number information 15 of a button telephone set 14 for setting the system data 13.

FIGS. 17 and 18 show two types of a display unit of the button telephone set 14 connected to the multi-functional telephone apparatus shown in FIG. 16. Of these, a display unit 21 shown in FIG. 17 is made up of a switch unit 23 having 20 button switches $22_1$ to $22_{20}$ and display lamps $24_1$ to $24_{20}$ arranged in the vicinity of the button switches $22_1$ to $22_{20}$ in a one-to-one relation therewith. The display unit 21 has 20 button switches $22_1$ to $22_{20}$ in order to cope with a larger number of line wires, amounting to 17 line wires at the maximum, and three special buttons.

A display unit 31 of the button telephone set, shown in FIG. 18, is made up of a switch unit 33, having an array of 10 button switches $32_1$ to $32_{10}$, and display lamps $34_1$ to $34_{10}$ arranged in the vicinity of the button switches $32_1$ to $32_{10}$ in a one-to-one relation therewith. The display unit 31 has the 10 button switches $32_1$ to $32_{10}$ in order to cope with a smaller number of line wires, that is not larger than 7 line wires, and three special buttons.

Reverting to FIG. 16, if the discriminating means 11 processes the system data 13, the data can be associated with e.g., 20 items, and the data is from the button telephone set 14 having the display unit 21 shown in FIG. 17, the data can be input at a time from this display unit 21 of the telephone set 14 having the 20 button switches $22_1$ to $22_{20}$. That is, by registering the system data in a memory table 16 of the processing means12 and routing the registered confirmation data to the display unit 21 shown in FIG. 17 for selectively lighting associated ones of the 20 display lamps $24_1$ to $24_{20}$, it is possible to confirm the operating contents of the 20 button switches $22_1$ to $22_{20}$ of the button telephone set 14.

On the other hand, if the system data 13 are sent from the button telephone set 14 having the display unit 31 shown in FIG. 18, data of 10 items at the maximum, among 20 items of the system data 13, can be operated by the button switches $32_1$ to $32_{10}$ for demonstration on display lamps $34_1$ to $34_{10}$. Therefore, in this case, the 20 items of data are split into two portions and sent in two installments to the multi-functional telephone apparatus. The determining means11 includes a telephone number table 17 in its inside and discriminates, based on the registration number information 15 of the button telephone set 14, whether the button telephone set is of the type having the display unit 21 shown in FIG. 17 or of the type having the display unit 31 shown in FIG. 18. If the button telephone set is of the type having the display unit 21, the non-split system data 13 is received and confirmation data of 20 bits is also transmitted at a time to the button telephone set 14 for demonstration at a time on the 20 display lamps $24_1$ to $24_{20}$.

Conversely, if the system data 13 are sent from the button telephone set 14 having the display unit 31 shown in FIG. 18, ten items of the system data 13 are received in two installments, whilst ten items of confirmation data are also transmitted in two installments to the button telephone set 14 for time-division demonstration on the display lamps $34_1$ to $34_{10}$.

Meanwhile, in the proposal shown in this JP Patent Kokai Publication JP-A-61-13898, the button switches $22_1$ to $22_{20}$ or the button switches $32_1$ to $32_{10}$ are associated with the lamps $24_1$ to $24_{20}$ or display lamps $34_1$ to $34_{10}$, respectively. Recently, a telephone apparatus having a display such as a liquid crystal display is coming into extensive use (see, for example, JP Patent Kokai Publications JP-A-2-49078 or JP-A-6-54361). Thus, letters etc. so far demonstrated by a display lamp can now be demonstrated on this display.

SUMMARY OF THE DISCLOSURE

There is much desired in the conventional electronic apparatus such as multi-functional telephone apparatus capable of setting or modifying the apparatus upon use. The following analysis is given by the inventor of the present invention.

If a telephone set, such as a button telephone set, is used for setting system data in the multi-functional telephone apparatus, it has now become customary to demonstrate letters etc. on a display provided on the telephone set. However, in ordinary telephone sets, the area allocated to a display is not large. Therefore, if an attempt is made to demonstrate letters or numerical figures for system data setting, referred to below simply as letters, at a time, limitations have to be placed on the number of demonstrated letters or on the display size.

So, if plural setting operations have to be performed for a setting registration of system data, it is proposed to demonstrate an operating picture on a display from one setting operation to another. In this proposal, a setting operation is executed sequentially from one setting picture to another.

FIG. 19 shows a manner of system data setting in a multi-functional telephone apparatus proposed in the prior art. First, an operation $A_1$ is performed on an operating portion 41 of a telephone set to demonstrate a setting picture $B_1$ on a display 42, and an operation $C_1$ then is performed to memorize partial setting data $D_1$ on a storage unit. An operation $A_2$ then is performed on the operating portion 41 of the telephone set to demonstrate a setting picture $B_2$ on the display 42, and an operation $C_2$ then is performed to memorize another partial setting data on the storage unit. Finally, an operation $A_3$ then is performed on the operating portion 41 of the telephone set to demonstrate a setting picture $B_3$ on the display 42, and an operation $C_3$ then is performed to memorize the remaining partial setting data $D_3$ on the storage unit. In this manner, ultimately required unified setting data $(D_1+D_2+D_3)$ is realized in the storage unit 43.

However, if the three setting pictures $B_1$, $B_2$ and $B_3$ as shown in FIG. 19 are taken as an example, it is necessary with this proposal to select the sequence of the setting pictures $B_1$, $B_2$ and $B_3$ without errors to set the individual setting data $D_1$, $D_2$ and $D_3$. If an error is committed in the sequence of selection of the setting pictures $B_1$, $B_2$ and $B_3$ or if the system data setting is terminated without selecting certain setting pictures, the necessary setting data $(D_1+D_2+D_3)$ cannot be obtained in the storage unit 43.

In the conventional proposal of this sort, the sequence of the setting operations is previously set, and cannot be used with ease except for installing a new multi-functional telephone apparatus. That is, system data are registered in the customary multi-functional telephone apparatus in the following three cases:

(1) New Installation of Multi-Functional Telephone Apparatus

This is the case of system data registration in installing a new multi-functional telephone apparatus. The system data for operating the system needs to be registered in keeping with the using environments, such as the number of networks or the presence or absence of door-phones.

(2) Addition of Hardwares

If a new apparatus (hardware) such as a telephone set or a door-phone is to be added, system data for coping with this addition needs to be registered.

(3) When a Function is to be Added or Modified

After completing a system, it is possible to add or modify the function by adding a software or by changing contracts with a telephone company, without adding the hardware. An example of such case is addition of a function of automatically selecting a network of low billing rate to make a telephone call or placing a specified telephone set under line wire restriction so that local call is possible but a long-distance call is not possible. If the addition or modification of functions it to be made in this manner, system data needs to be registered such as to cope with the as-modified system.

In registration, the system data in question differs depending on the contents of registration. When adding hardware or special functions, not only is registration of unique system data directly pertinent to these individual hardware items or functions required, but there persists system data required in common by these hardware items or functions. In newly installing the multi-functional telephone apparatus stated in (1) above, system data registration operations which take an overall perspective view to a certain extent is possible, so that there is practically useful meaning in pre-setting and sequentially executing a sequence of registration operations by the proposal shown in FIG. 19. However, in registering system data accompanying partial system changes indicated in (2) or (3), it is difficult to locate the place of registration associated with the individual hardware items or functions, whilst it is also difficult to discriminate which is the system data that need to be modified in common.

Thus, in consideration of system data registration accompanying these partial system changes, it may be contemplated to provide a separate system data registration picture from one hardware item or function to another. By this technique, not only system data required to be modified uniquely but also system data required to be modified in common can be registered on a dedicated picture.

However, if a registration picture is to be prepared for each hardware item or function of a multi-functional telephone apparatus, the corresponding development operation is extremely time-consuming. In addition, the more diversified the function of the multi-functional telephone apparatus, the larger becomes the number of pictures for registration, thus increasing the scale of the corresponding software.

On the other hand, there is presented a problem in installing a new multi-functional telephone apparatus, stated in (1). Specifically, there are occasions wherein a small-scale system in expectation of future progress is installed newly without constructing a system of a scale in meeting with the multi-functional telephone apparatus from the outset. In such case, there is a possibility that, for a small-scale user, the function of the hardware used is limited to only a portion of the inherent system. However, the menu for installing a new multi-functional telephone device is prepared on a presupposition that the totality or majority of system data are set. Thus, for such a small-scale user, it is frequently efficient to select a menu for setting for a port ion of the system, rather than using a menu for installing a new apparatus.

The line wire of a multi-functional telephone apparatus is taken as an example. The line wire may be exemplified by an ordinary analog network, an analog network for accommodating dial-in, an analog network capable of notification of a calling party number, and ISDN (integrated services digital network). A multi-functional telephone apparatus presupposed to be connected to all of these four networks is assumed to exist. A small-scale user attempts to connect only a commonplace analog network among the four networks initially to construct a system. According to the proposal, shown in FIG. 19, system data needs to be set inclusive of the processing pertinent to connection to the dial-in accommodating analog network or to the ISDN, with the result that system data cannot necessarily be registered efficiently.

Although the multi-functional telephone apparatus has so far been mainly explained, similar problems exist in connection with various electronic apparatus, such as facsimile apparatus, portable electronic apparatus generally, e.g., audio-video apparatus, pocket-sized handy computers etc.

It is therefore an object of the present invention to provide an electronic apparatus and a multi-functional telephone apparatus in which system data setting employing plural pictures can be realized efficiently no matter whether the setting is new or it is setting for addition of hardwares or functions.

It is another object of the present invention to provide an electronic apparatus and a multi-functional telephone apparatus in which system data can be set with improved operability when setting the system data using plural pictures.

According to a first aspect of the of the present invention, there is provided an electronic apparatus including (a) a storage unit configured for storing links from each selection item to individual setting data, from one selection item to another, each selection item encompassing a plurality of groups collected together on the basis of a concept as an upper order concept, each of the groups encompassing individual setting data for specified individual setting of a system, collected based on a preset concept, there being provided a plurality of sets of different ones of the selection items as an upper order concept and different ones of the preset concepts as a lower order concept under the presence of common individual setting data; (b) a selection item selection unit configured for selecting one of a plurality of the selection items in the storage unit displayed collectively, and (c) a setting data setting unit configured for enabling setting of individual setting data belonging to a displayed group by displaying the groups belonging to a selection item when the selection item is selected by the selection item selection unit.

That is, in the subject-matter of the first aspect, respective setting data pertinent to individual hardwares or softwares necessary for operating a system of an electronic apparatus are collected together (and classified) in plural groups so that the respective setting data can be selected with a selection item allotted to one of the groups. The setting data are collected together into any of plural groups with a different concept so that the respective setting data can be selected with a different selection item. In a similar manner, plural selection items are provided and links from these selection items to the individual setting data are stored from one selection item to another. A plurality of these selection items with different concepts are collectively (comprehensively) displayed for selection by the selection item selection unit. From the selected selection item, a link is traced to get to the setting data through a group to realize setting of the individual setting data as necessary. In this manner, an operator is able to get to a setting item most suited to an environment as regards the data setting to effect the setting to realize an operation with high efficiently and operability.

According to a second aspect of the present invention, there is provided a multi-functional telephone apparatus comprising (a) a storage unit configured for storing links from each selection item to individual system data from one selection item to another, each selection item encompassing a plurality of groups collected together on the basis of a concept as an upper order concept, each of the groups encompassing individual system data as setting data for specified individual setting of a multi-functional telephone apparatus, collected based on a preset concept, there being provided a plurality of sets of different ones of the selection items as an upper order concept and different ones of the preset concept as a lower order concepts, under the presence of common individual system data, (b) a selection item selection unit configured for selecting one of a plurality of the selection items in the storage unit displayed collectively, and (c) a system data setting unit configured for enabling setting of individual system data belonging to a displayed group by displaying the groups belonging to a selection item when the selection item is selected by the selection item selection unit.

That is, in the subject-matter of the second aspect, respective system data as setting data pertinent to individual hardwares or softwares necessary for operating a system of an electronic apparatus are collected together in plural groups so that the respective system data can be selected with a selection item. These system data are collected together (i.e., classified) into plural groups with a different concept so that the respective system data can be selected with a different selection item. In a similar manner, plural select ion items are provided and links from any of these selection items to the individual system data are stored from one selection item to another. A plurality of these selection items with different concepts are collectively (cumulatively) displayed for selection by the selection item selection unit. From the selected selection item, a link is traced to get to a system data through a group to realize setting of the individual system data as necessary. In this manner, an operator is able to get to the setting item most suited to an environment as regards the system data setting to effect the setting to realize an operation with high efficiently and operability.

In a third aspect, one of the selection items in the multi-functional telephone apparatus of the second aspect is a selection item of a list of system data which is a summary of the entire system data collected systematically into a plurality of groups.

That is, in the third aspect, one of the selection items in the multi-functional telephone apparatus is shown. Specifically, it is shown that this is a selection item of a list of system data which is a summary of the entire system data collected systematically into a plurality of groups. This selection item is conveniently selected for doing overall setting such as for installing a multi-functional telephone apparatus.

In a fourth aspect, one of the selection items in the multi-functional telephone apparatus of the second aspect is a substrate-based selection item for substrate selection which is a summary of substrates inserted into respective slots of a motherboard, with a plurality of the substrates being collected in respective groups.

That is, in the fourth aspect, one of the selection items in the multi-functional telephone apparatus is shown. Specifically, it is shown that this is a substrate-based selection item for substrate selection which is a summary of substrates inserted into respective slots of a motherboard, with a plurality of the substrates being collected in respective groups. This selection item enables efficient setting in case of adding a specified substrate to a slot of a certain unit.

In a fifth aspect, at least a portion of the system data in the multi-functional telephone apparatus of the second aspect is collected together to constitute sub-groups based on a specified function to which the data are relevant in common.

That is, in the fifth aspect, a certain number of plural system data positioned at any of terminal ends are collected together as a sub-group from the standpoint of the function to facilitate collective registration of these system data. When the same sub-group is used in other portions of the apparatus, designing management is facilitated for the designer of the multi-functional telephone apparatus.

In a sixth aspect, the system data setting unit in the multi-functional telephone apparatus of the second aspect includes a group displaying unit configured for displaying a group relevant to a selected selection item, a system data selection unit configured for selecting individual system data from the group displayed by the group displaying means, a system data setting unit configured for setting system data selected by the system data selection means, and system data registration unit configured for registering the system data as set in a system data registration area used as a reference in the operation of an apparatus.

That is, in the sixth aspect, one of the plural selection items is selected, plural groups from the selection item are displayed, a specified group is selected therefrom, and system data in the selected group are set to desired contents and registered in a system data registration area. Although the same system data may be set no matter which one of the selection items is selected, the contents of the system data can be set efficiently in a clear wasteless fashion by selecting the system data based on the optimum selection item and group as well as optimum concept under an existing environment of the operator.

In a seventh aspect, the system data registration area in the multi-functional telephone apparatus of the sixth aspect is arranged on a main body portion having a function of a telephone set wherein the setting data setting unit excluding the system data registration area, the storage unit and the select ion item selection unit are arranged on the side of a system data registration terminal removably arranged on the main body portion.

That is, in the seventh aspect, the system data registration area is arranged on the main body portion of the apparatus having the function of the telephone set. The registration operation is carried out on connecting the system data registration terminal to the main body portion of the apparatus. This enables a system data registration terminal, such a personal computer, to be connected to the main body portion of the apparatus to perform the registration operation to simplify the circuitry of the main body portion of the apparatus as well as to relieve the load otherwise imposed on the main body portion of the apparatus due to the presence of the system data registration terminal. The system data registration terminal is used in common by the computer, telephone set or a variety of information terminals to provide for an economic structure of the entire system.

In an eighth aspect, the system data registration terminal in the multi-functional telephone apparatus of the sixth aspect has an area for storage of the same data as the system data registered in the system data registration area, wherein, when system data newly set or changed is routed to the system data registration area, a difference thereof from data already registered in the system data registration area is determined, and the resulting difference data is sent to the main body portion.

That is, if, in the eighth aspect, a personal computer, for example, is also used as a system data registration terminal, a portion of the recording medium can be used to hold data for system management owned by the main body portion of the apparatus. In this case, the data thus held can, of course, be used as backup data. In addition, when new data is transferred by system changes etc. to the main body portion of the apparatus, difference data may be extracted and transmitted to reduce the amount and time for data transmission.

BRIEF DESCRIPTION OF THE DRAWINGS

FIG. 3 illustrates system data in the multi-functional telephone apparatus of the present embodiment.

FIG. 4 shows a hardware relevant table of FIG. 2 in more detail.

FIG. 5 shows a function relevant table of FIG. 2 in more detail.

PREFERRED EMBODIMENTS OF THE INVENTION

Embodiment

The present invention will be hereinafter explained with reference to certain preferred embodiments thereof.

Figure 1:
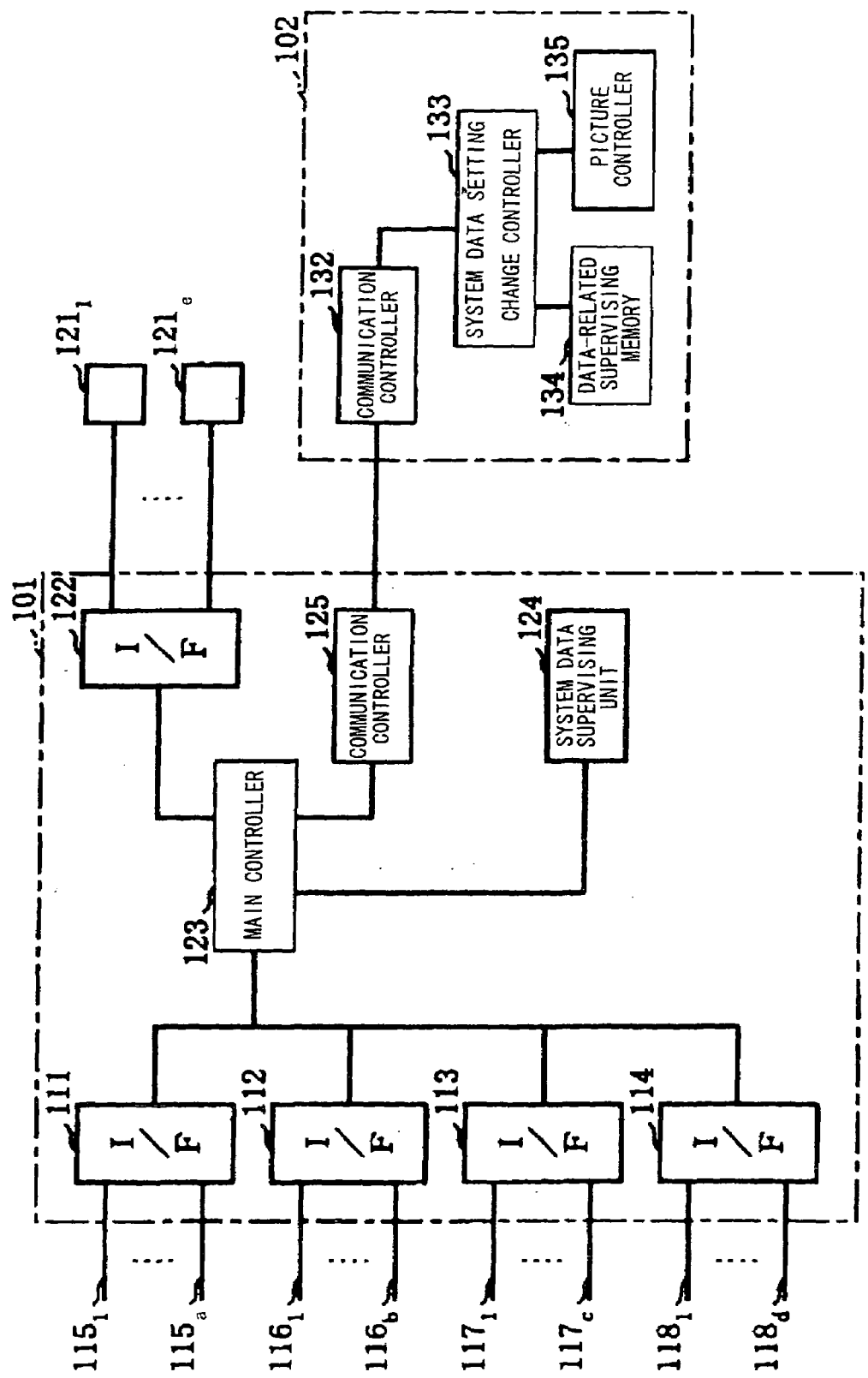
FIG. 1 is a block diagram showing the concept of a multi-functional telephone apparatus according to an embodiment of the present invention.

FIG. 1 shows schematics of a structure of a multi-functional telephone apparatus according to a preferred embodiment or the present invention. This multi-functional telephone apparatus is made up of a main body portion 101 and a system data registration terminal 102 detachably connected to this main body portion 101.

The main body portion 101 includes four line wire interfacing units, namely a routine analog line wire interfacing (I/F) unit 111, a dial-in accommodating analog line wire interfacing unit 112, a calling party number notification accommodating line wire interfacing unit 113 and an ISDN accommodating line wire interfacing unit 114. It is noted that the routine analog line wire interfacing unit 111 accommodates routine analog line wires $151_1$ to $115_a$, where a denotes an optional integer not less than 1, whilst the dial-in accommodating analog line wire interfacing unit 112 accommodates dial-in accommodating analog line wires $116_1$ to $116_b$, where b denotes an optional integer not less than 1. The calling party number notification accommodating line wire interfacing unit 113 accommodates calling party number notification accommodating analog line wires $171_1$ to $117_c$, where c denotes an optional integer not less than 1, whilst the ISDN accommodating line wire interfacing unit 114 accommodates ISDN accommodating line wires $118_1$ to $118_d$, where d denotes an optional integer not less than 1.

Within the main body portion 101, there is provided, in addition to the above-mentioned interfacing unit for line wires 111 to 114, a private branch line telephone set interfacing unit 122 housing private branch line telephone sets $121_1$ to $121_e$, where e denotes an optional integer not less than 1. These interfacing units 111 to 114 and 122 are connected to a main controller 123 configured for controlling the overall apparatus. To the main controller 123 are connected a system data supervising unit 124 managing registration or change of system data in the main body portion 101 and a communication controller 125. The main controller 123 includes a CPU (central processing unit), a storage medium such as a magnetic disc or a ROM (read-only memory) having stored therein a control program and a work memory such as RAM (random access memory). The system data supervising unit 124 is configured in a similar manner. So, the system data supervising unit 124 and the main controller 123 may be mounted on the same hardware, with only the respective functions differing from each other. The communication controller 125 has a function of controlling the communication with the system data registration terminal 102 connected to the main body portion 101.

The system data registration terminal 102 includes a communication controller 132 connected to the communication controller 125, and is connected to a system data setting change controller 133 configured for controlling changes of the system data. Similarly to the main controller 123, the system data setting change controller 133 includes a storage medium, such as a magnetic disc or ROM, having a control program recorded thereon, and a work memory, such as RAM.

To the system data setting change controller 133 are connected a data-related supervising memory 134 and a picture controller 135. In the data-related supervising (or managing) memory 134, there is stored a relevant information table stating the relation between the hardware of the main body portion of the apparatus and various functions on one hand and system data on the other hand. The image controller 135 is a circuit portion for controlling the demonstration on the setting image (or logo) on a display, not shown. It is noted that, if a display, such as a liquid crystal display, is enclosed in a system data registration terminal 102, such display may be used. Alternatively, a display apparatus connected to a video output terminal of the system data registration terminal 102 may be used as a display.

The system data registration terminal 102, configured as described above, need not be a dedicated terminal. That is, in order to change the system data of the main body portion 101, it is possible to mount a preset software on a telephone set, capable of functionally implementing the above-mentioned circuit port ions, or to use a preset information terminal, such as a personal computer, a word processor or a portable information terminal, in a similar manner. In using the telephone set as the system data registration terminal 102, an image (picture) controlled by the image controller 135 is a display, such as a liquid crystal display, enclosed in the telephone set. If a preset information terminal, such as a personal computer, is used as a system data registration terminal 102, the image controller 135 is a circuit controlling a dedicated monitor provided on the information terminal or a display unit enclosed in or attached externally to the information terminal.

Figure 2:
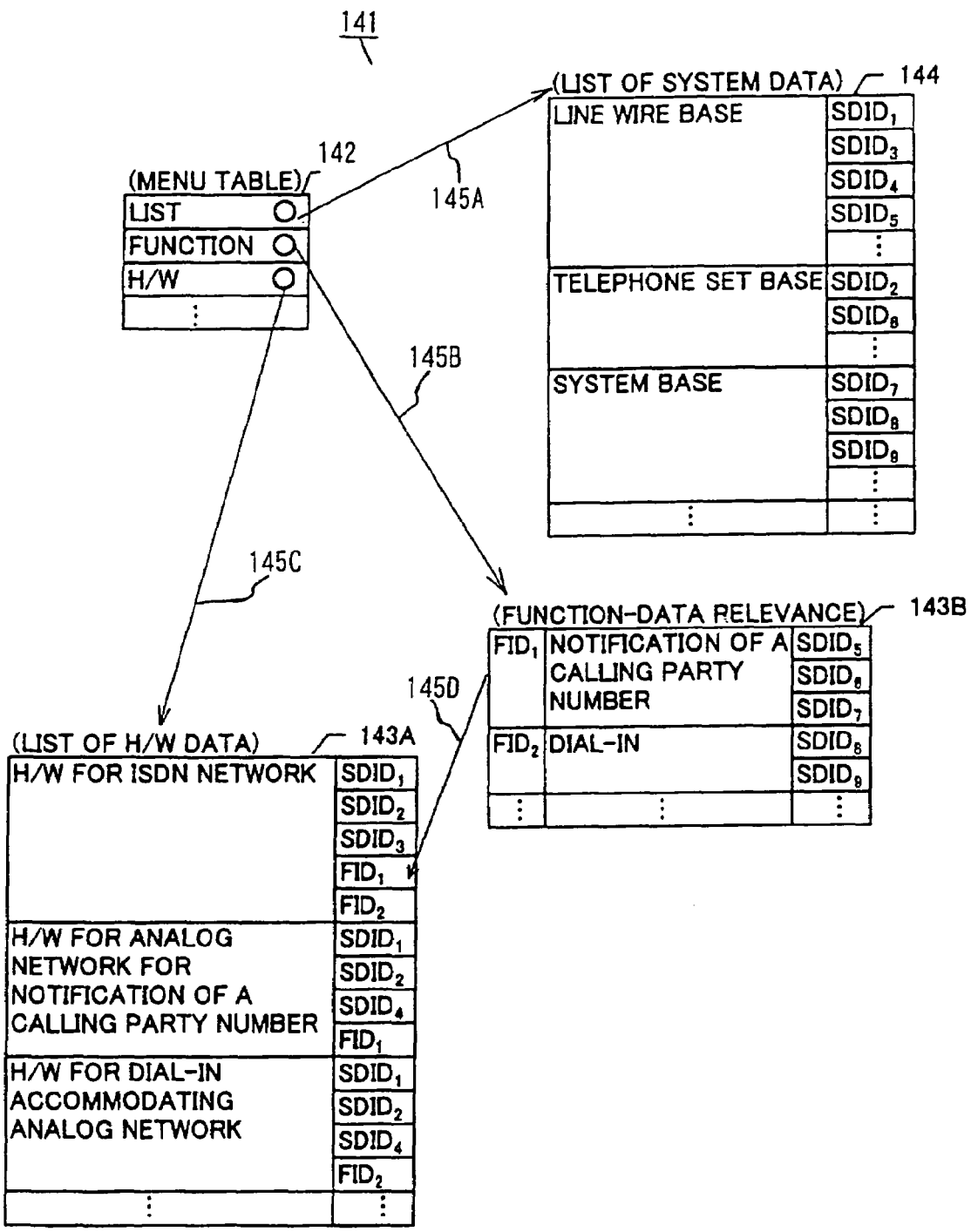
FIG. 2 shows the structure of a relevant information table provided in a data relevant management memory in the present embodiment.

FIG. 2 shows a structure of a relevant information table provided in a data-related supervising memory. The relevant information table 141 is made up of a menu table 142 for demonstrating a menu for setting operations on a display, not shown, plural data-related tables 143 for displaying constituent elements from one setting operation to another and a system data table 144 for demonstrating the contents of respective system data. In the present embodiment, there are provided, as the data-related tables 143, a hardware-related table 143A handling data relevance pertinent to the hardware (H/W) and a functional data related table 143B handling functional data relevance. On the menu table 142 are demonstrated a list of system data and a menu specifying respective contents of the data-related tables 143, which are "functions" and "hardware (H/W)" in the present embodiment.

The three tables 142 to 144 are related with one another by a pointer 145. For example, if the "function" is selected on the menu table 142, the functional data related table 143B is referred to by the pointer 145B.

FIG. 3 shows system data in the multi-functional telephone apparatus of the present embodiment. The system data is distinguished by SDID (System Data Identification) or system data descriptors. The first $SDID_1$ represents system data pertinent to registration of the hardware (H/W). The second $SDID_2$ represents system data used for registering the line wire on a button of the telephone set. The third $SDID_3$ represents system data for adjusting the volume of call sound volume. The fourth $SDID_4$ represents system data used for registering dial sorts such as dial pulses or push-buttons. In similar manner, variable data usable in this multi-functional telephone apparatus are provided as system data.

FIG. 4 shows, in more detail, the hardware-related table 143A shown in FIG. 2. In this figure, the "H/W (hardware) for ISDN network" denotes a group of the hardware required when newly using the ISDN network while an analog circuit is in use. The "H/W for calling party number notification analog network" denotes a group of the hardware newly required in notifying the calling party number using an analog network. The "H/W for dial-in accommodating analog network" denotes a group of the hardware newly required in realizing dial-in using an analog network. The groups of various hardware items are provided, as shown in FIG. 4.

FIG. 5 shows, in more detail, the functional data related table 143B shown in FIG. 2. The various functions constituting the multi-functional telephone apparatus need to be supplemented or changed as to the function of "automatic tuning origination" automating the tuning and origination, the function of "low toll network automatic tuning and origination" of automatically selecting only a network of low toll for origination, the function of "origination on designated line wire" of origination only for the designated line wire and the function of "re-origination" of trying re-origination after a specified time.

It is noted that the system data $SDID_1, SDID_2, SDID_3, \ldots$ shown in FIG. 3, these data are classified into several groups, as indicated in the system data table 144 shown in Table 2, to permit targeted system data to be located quickly. In the present embodiment, the system data are classed into those of the line wires, telephone set, system etc. As for the line wire group, data most pertinent to the line wire (system data identifier), such as first $SDID_1$ (hardware registration), third $SDID_3$ (adjustment of call sound volume level) or the fourth $SDID_4$ (registration of dial type) are selected out and determined as a list.

As for the group of the telephone set, system data most pertinent to the telephone set, such as the second $SDID_2$ (registration of the line wire on a button of the telephone set) or the sixth $SDID_6$ (change or no change in the name of the calling party number) are selected out and determined as a list. As for the system-based group, data most pertinent to the system itself, such as the seventh $SDID_7$ (name registration for the calling party number) or the eighth $SDID_8$ (significant digits of dial-in) are selected out and determined as a list. Of course, judgement as to which class belongs a system data may differ from person to person. In such case, the same system data may be registered in plural classes in case where the results of judgement overlap each other.

As for each hardware, shown in FIG. 4, the relation of correspondence between the system data required in changing or adding the hardware and the FID (Function Identifier) is shown in the hardware-related table 143A. For example, if the H/W for ISDN network shown in FIG. 4 needs to be installed by changing from the analog network to the ISDN network, there are required the registration processing for the first to third system data (H/W registration, line wire registration on the telephone set button, adjustment of call sound volume level) and processing of respective system data indicated by the first and second sub-groups $FID_1$ and $FID_2$.

The contents of the first and second sub-groups $FID_1$ and $FID_2$ are shown in the functional data related table 143B handling the data pertinence as to the functions and in FIG. 5. That is, in the functional data related table 143B, several functions required in adding or changing the hardware are shown in combination with the system data used for implementing these functions.

For example, the first $FID_1$ summarizes, as system data for realizing the calling party number display function of demonstrating the calling party number, the SDID (System Data Identifiers) of three system data, that is the fifth $SDID_5$ (registration of the calling party number demonstrating telephone set) sixth $SDID_6$ (change or no change in the name of the calling party number) and the seventh $SDID_7$ (registration of name for the calling party number). Similarly, the second $FID_2$ summarizes, as system data for realizing the dial-in, the SDID of two system data, that is the eighth $SDID_8$ (significant digits of dial-in) and the ninth $SDID_9$ (dial-telephone set number correspondence). The other FIDs, such as the third $FID_3$, not shown, represent combinations of several SDIDs of system data used for implementing respective functions.

Thus, the respective FIDs are grouped as common functions for implementing the various hardware items. For example, the first $FID_1$ is a function identifier used not only as "H/W for ISDN network", but as "H/W for an analog network for notifying a calling party number", as may be seen from the hardware-related table 143A shown in FIG. 2. Similarly, the second $FID_2$ operates as a function identifier used not only as "H/W for ISDN network", but as "H/W for a dial-in accommodating analog network". By handling plural system data as a package of specified functions (sub-group) and by employing the FID as a function identifier, the management is simpler than a case where management is performed only for individual system data.

A typical practical operation of setting or changing system data using the above-described multi-functional telephone apparatus is now explained. In setting or changing the system data, a system data registration terminal 102 is pre-connected in the present embodiment to the communication controller 125 of the main body portion 101 shown in FIG. 1. Here, a routine personal computer is connected as the system data registration terminal 102. The personal computer is made up of a main computer portion, not shown, having a CPU (central processing unit), a hard disc etc, and peripherals connected thereto, such as a keyboard or a mouse, or a display (monitor) etc, also not shown. In the hard disc of the main computer portion, there is stored a program for setting or changing system data of the multi-functional telephone apparatus.

When employing the personal computer as the system data registration terminal 102 for setting or changing the system data, an operator desirous of making such setting or change starts a program used therefor. This causes a command for setting or changing the system data to be sent from the system data registration terminal 102 to the main body portion 101 through a communication controller 132.

Figure 6:
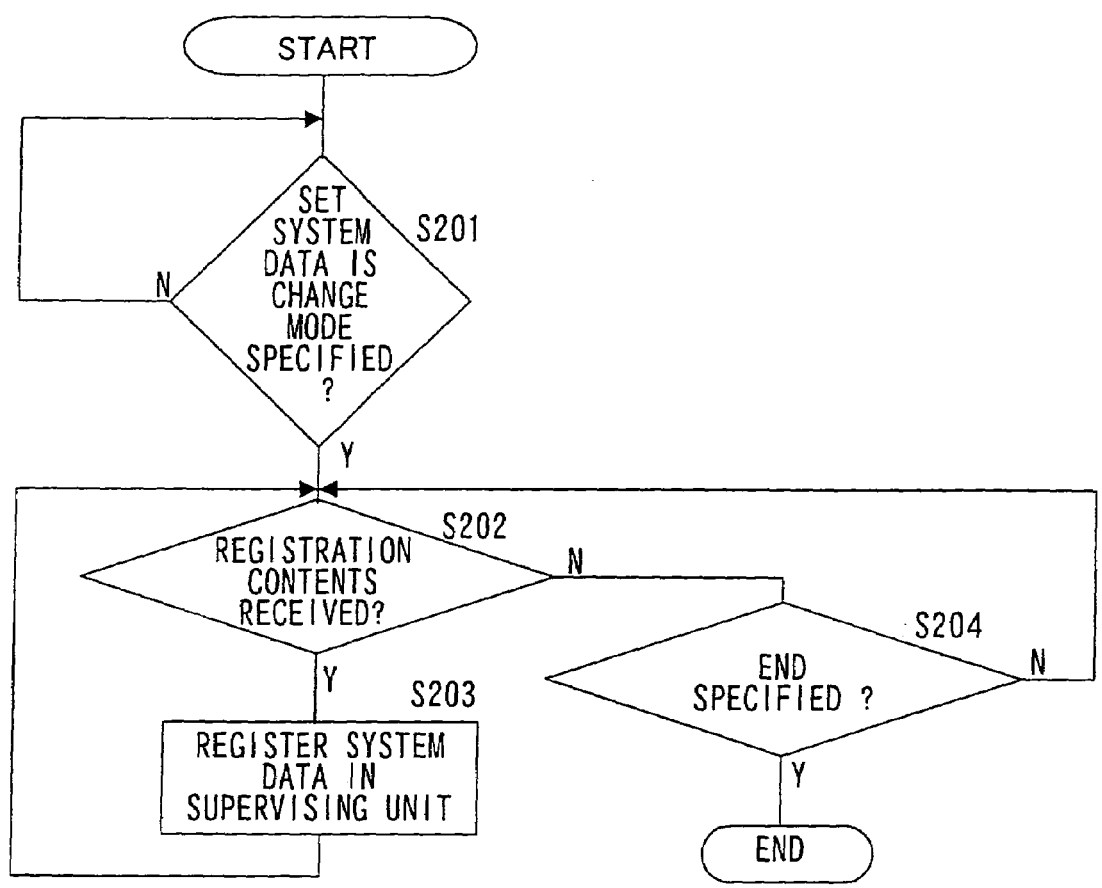
FIG. 6 is a flow diagram showing schematics of an operation performed on the main body portion of the apparatus in setting or changing system data in the present embodiment.

FIG. 6 shows schematics of an operation performed on the side of the main body portion of the apparatus in setting or changing the system data. When fed from the system data registration terminal 102 through the communication controller 125 with a command for setting or changing the system data (step S201: Y), the main controller 123 of the main body portion 101 transfers to a mode of changing the setting of the system data as it executes other routine functions of the multi-functional telephone apparatus in parallel. In this mode, when fed from the system data registration terminal 102 with registration contents used in setting or changing the system data, the main controller 123 registers the received contents in the system data supervising unit 124.

In the present embodiment, each time the system data registration terminal 102 sequentially issues a command for registration, the system data supervising unit 124 on the side of the main body portion 101 registers the system data in an enclosed non-volatile memory or changes the contents of registration. So, the registration contents continues to be received in a stand-by state until a command for terminating the processing of setting or changing the system data is sent from the system data registration terminal 102 (Step S204). When fed with the command for terminating the processing of setting or changing the system data, the main body portion 101 terminates the processing of setting or changing the system data (End).

Figure 7:
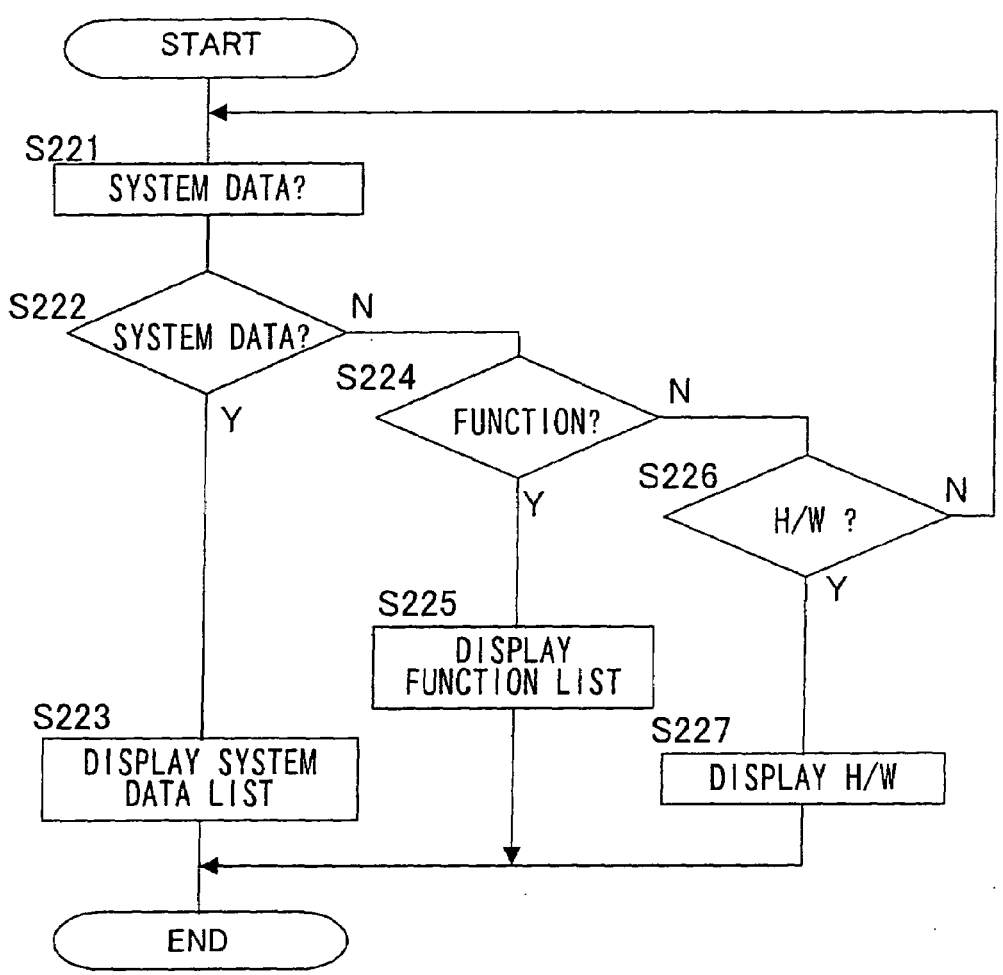
FIG. 7 is a flow diagram showing an operation for demonstrating a list used in system data registration in the present embodiment.

FIG. 7 shows the flow of a sequence of operations for registering system data. This sequence of operations is carried out by the system data registration terminal 102. On startup of the system data setting change controller 133, a menu selection picture (logo or symbol) is demonstrated on a display connected to the personal computer (step S221). This menu selection picture shows contents of the menu table 142 shown in FIG. 2. In the present embodiment, there are displayed a menu item for selecting one of the "system data list display", "function list display" and "H/W list display". The operator selects one of the menu items with a mouse or a cursor connected to the personal computer.

If the operator has commanded "display a list of system data" (step S222: Y), the list of system data is demonstrated on the display (step S223). Specifically, there is displayed a letter indication for demarcating the system data, such as "line wire", "telephone set" or "system" in a system data table 144 shown in FIG. 2. At this stage, indication such as "SDID$_1$" is not displayed. If the operator commands selection of "display a list of functions" (step S224: Y), a list of functions is demonstrated (step S225). Specifically, the contents shown in FIG. 5 are demonstrated on the display. If the operator has selected "H/W list display" (step s226: Y), a list of hardware is displayed (step S227). Specifically, the contents shown in FIG. 4 are demonstrated on the display.

Figure 8:
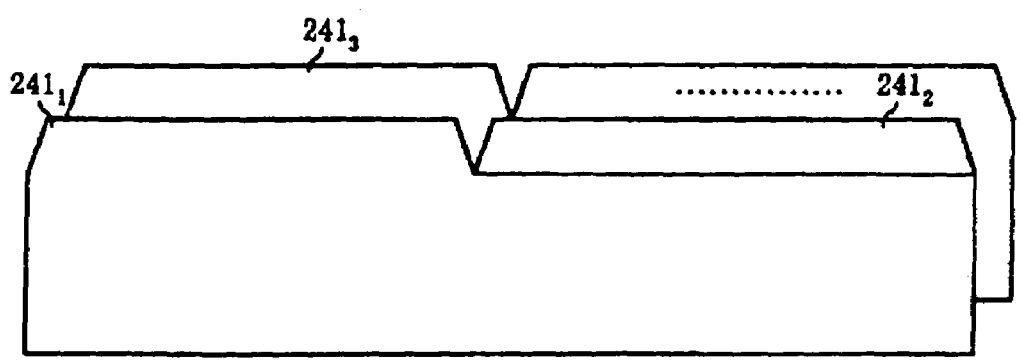
FIG. 8 is a schematic plan view of a display in the present embodiment showing the status of a display screen when "H/W" is selected by an operator from a menu selection picture.

FIG. 8 shows display contents when the operator has selected "H/W" from the menu selection picture. On the display, there are demonstrated on the display such folders for hardware groups indicating the low order concept of the select ion item "H/W", such as a folder 241$_1$ of "H/W for ISDN network", a folder 241$_2$ for "H/W for analog network for notifying the calling party number" or a folder 241$_3$ for "H/W for dial-in accommodating analog network". The operator is able to select the folder of the pertinent hardware by clicking a desired tab of a folder 241. If the operation is facilitated by relying upon the concept "hardware", it is more convenient to select the lower order folder by selecting "H/W" from the menu selection picture.

Figure 9:
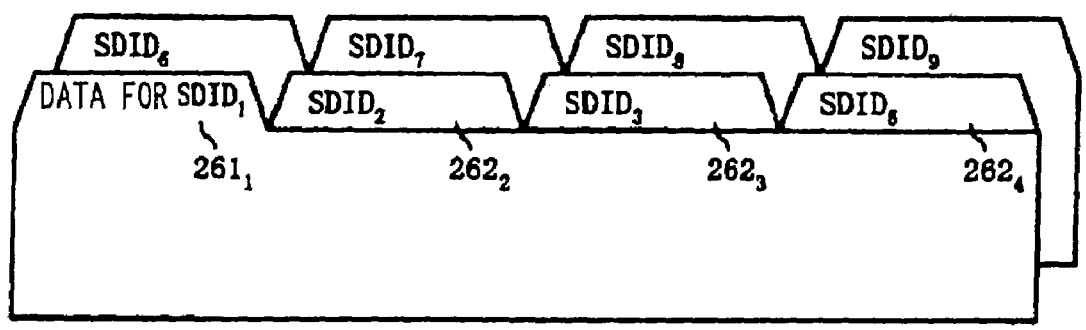
FIG. 9 is a schematic plan view of a display in the present embodiment showing the status of a display screen when "H/W" is first selected and subsequently an item "H/W for ISDN network" is selected from the menu picture.

FIG. 9 shows the state of the display picture when the operator has selected the item "H/W for ISDN network" from the demonstration state on the display shown in FIG. 8. On the display, there are demonstrated respective SDIDs necessary for setting the "H/W for ISDN network" in the forms of folders 261$_1$,261$_2$,261$_3$, . . . . As for the "H/W for ISDN network" in the hardware-related table 143A shown in FIG. 2, such a display configuration may be contemplated in which folders pertinent to the first and second FID$_1$ and FID$_2$ are demonstrated in addition to the folders 261$_1$,261$_2$,261$_3$, . . . pertinent to the first to third SDID$_1$ to SDID$_3$. However, this display configuration is not used in the present embodiment.

The reason is that, as may be understood from the functional data related table 143B of FIG. 2, if folders based on the function identifiers, that is FIDs, are prepared and displayed, these function identifiers need to be ultimately converted back to the SDID (system data identifiers). That is, SDIDs constituting the intermediate folders, namely FIDs, are displayed in association with the folders, without demonstrating these intermediate folders. These first to third FID$_1$ to FID$_3$ and the fifth to eighth FID$_5$ to FID$_8$ are selected on clicking the respective tabs with a mouse, as in FIG. 8.

The operator is able to select these folders 261$_1$,261$_2$, 261$_3$, . . . one-by-one to extend these folders 261$_1$,261$_2$,261$_3$, . . . to execute the setting or changes of the system data sequentially. Usually, processing is performed on the entirety of the folders 261$_1$,261$_2$,261$_3$, . . . . It is however possible for an operator to exercise discretion to select a portion of these folders to set or change the system data. There is no particular sequence in which to select the folders 261$_1$,261$_2$,261$_3$, . . . .

Figure 10:
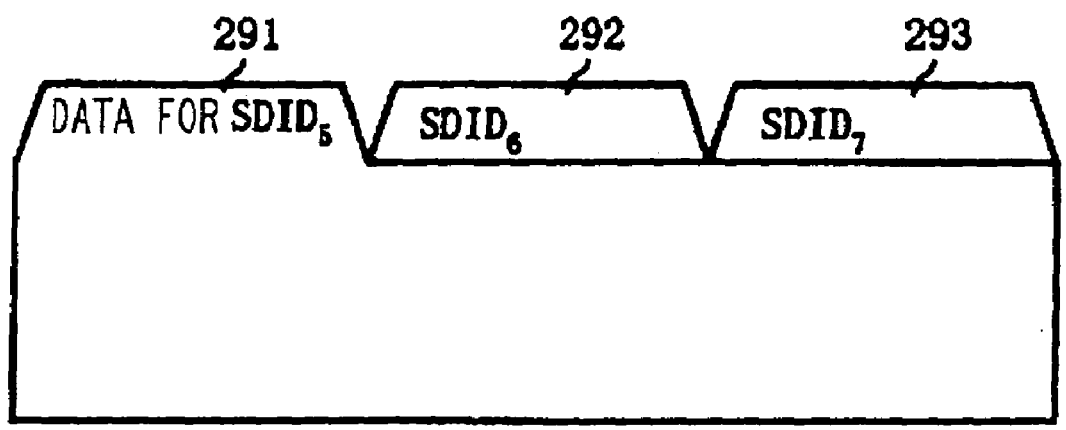
FIG. 10 is a schematic plan view of a display in the present embodiment showing the status of a display screen when "function" is first selected and subsequently "FID1" is selected from the menu picture.

FIG. 10 shows the state of the display picture in case the operator selects the "function" from the menu selection screen and subsequently selects an item (sub-group) "FID$_1$" from the variable items of the function identifiers "FD$_1$", "FD$_2$" or "FD$_3$" demonstrated on the display. This technique is conveniently used in case where system data setting or changes are to be carried out for a sole collection of functions. In the present embodiment, folders 291 to 293 for the fifth to seventh FIDs, namely FID$_5$, FID$_6$ and FID$_7$, are demonstrated on the display. The operator at the next step sequentially selects the tabs for these folders 291 to 293 to set or change the corresponding system data.

Figure 11:
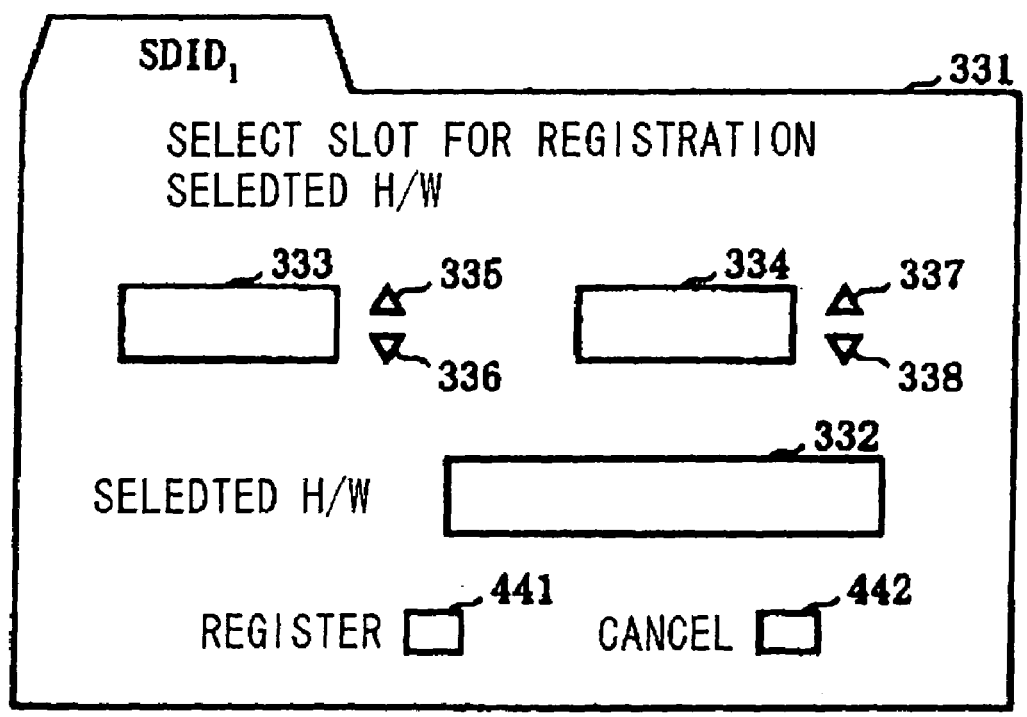
FIG. 11 is a schematic plan view of a display in the present embodiment showing a typical registration picture in which system data is to be registered.

FIG. 11 shows contents of the display demonstrated when the operator has selected the folder 261$_1$, demonstrated as first SDID$_1$ on the display screen shown in FIG. 9, using an input apparatus, such as a mouse. On the display, a registration picture 331 for registering the system data of the first SDID$_1$ is demonstrated, as shown. The selected hardware is displayed on registration subject display column 332. On this registration picture 331, the operator determines in which slot of which unit the hardware displayed within the registration subject display column 332 is to be inserted, and sets it on registration accordingly.

To this end, there are provided a selected slot display column 333 and a selected unit display column 334 on the registration picture 331. In the vicinity of the selected slot display column 333, there are provided a count-up button 335 for incrementing the slot number and a count-down button 336 for decrementing the slot number. In the vicinity of the selected unit display column 334, there are similarly provided a count-up button 337 and a count-down button 336. The operator acts on these buttons 335 to 338 to select the place in which to insert the hardware and pushes a registration button 441 to complete the registration of the system data pertinent to the first SDID$_1$. For cancelling the registration, the operator pushes a cancellation button 42. The operator terminates the registration for the required system data to complete the entire registration operation for the multi-functional telephone apparatus.

Figure 12:
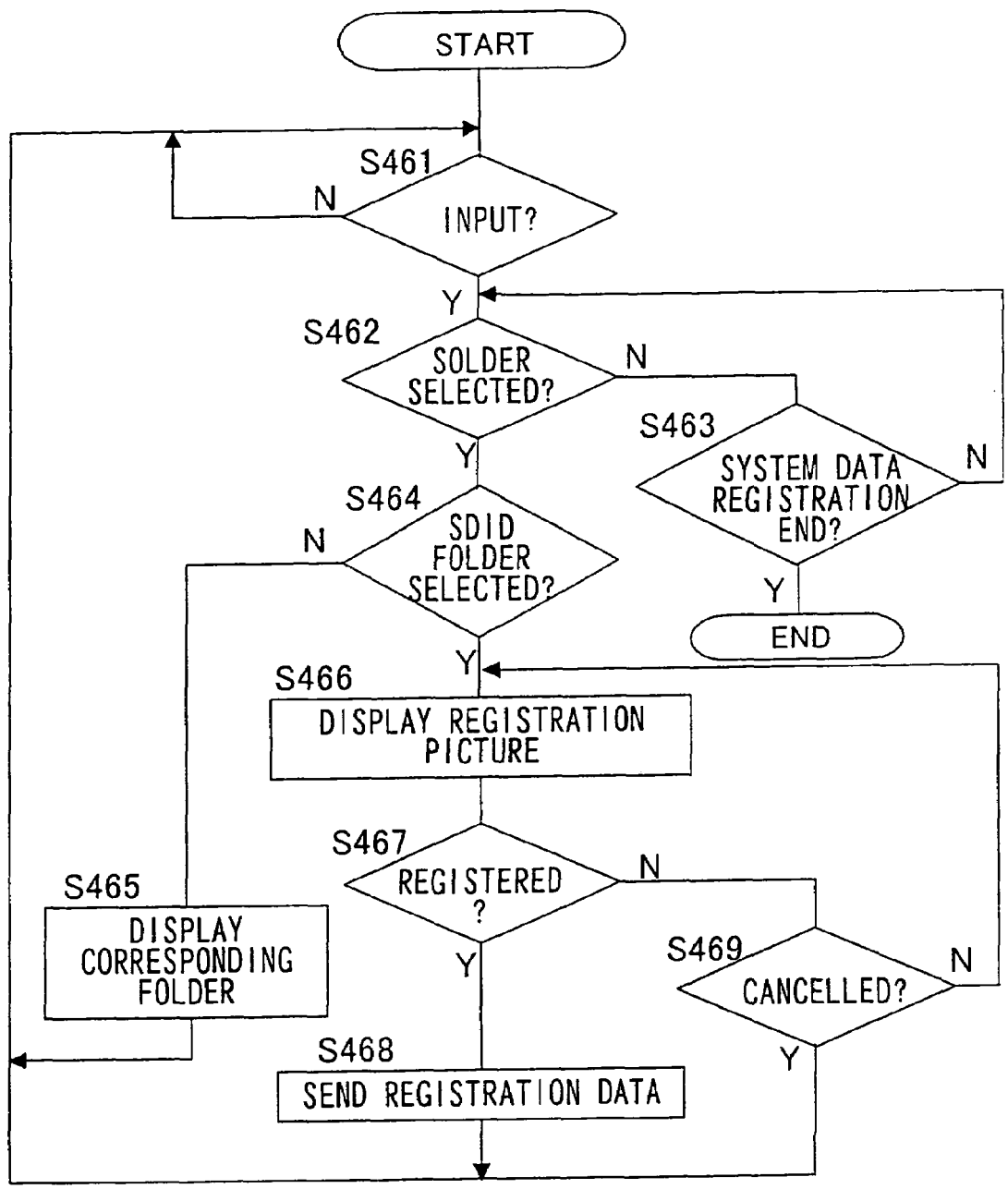
FIG. 12 is a flow diagram showing control contents on the side of the system data change terminal for processing setting change of system data after list display such as list display for hardware.

FIG. 12 shows the control contents on the system data changing terminal side for processing system data setting changes after the demonstration of the list for the hardware in FIG. 7 (steps S223, S225 and S227). When an inputting operation by an operator is performed (step S461; Y), the system data registration terminal 102 checks whether the operation is selection of the folder demonstrated on the display or a command for terminating the system data registration (steps S462, S463). If, in FIG. 7, the hardware is selected from the menu selection screen (step s226: Y), there are demonstrated on the display the folders for selecting the hardware group, such as "H/W for ISDN network", "H/W for analog network for notifying the calling party number" or "H/W for dial-in accommodating analog network" (see FIG. 8).

If the operator has selected the folder 241, of the "H/W for ISDN network" from these folders (step S462: Y), it is checked whether or not the selected folder is the SDID folder as a folder associated with the system data (step S464). This takes into account the possibility of selecting a lower layer folder before proceeding to the picture for registering the ultimate system data (see FIG. 11) because a folder as an upper concept of the SDID folder such as an FDID folder shown in FIG. 2 may be selected depending on the system for registration. If the SDID folder is as yet not selected (step S464: N), the corresponding folder is demonstrated on the display (step S465) to wait for an input (step S461).

If one of the SDID folders is selected at step S464 (Y), a screen for registration of the system data indicated by the SDID folder is displayed (at step S466; see FIG. 11). If, in this display state, the operator performs preset setting and pushes the registration button 441 (step S467: Y), the setting contents for the system data are transmitted from the system data registration terminal 102 to the main body portion 101 (step S468). If the operator has pushed the cancellation button 442 in place of the registration button 441 (step S469), processing reverts to step S461. If the operator input is not folder selection (step s462: N) but is the selection of a button for terminating the registration of system data, not shown (step S463: Y), the processing for registration of system data shown in FIG. 12 is terminated.

The registration processing for system data pertinent to hardware has been explained with reference to FIG. 12. However, if a display of another list, such as a display of a list of system data, as shown in FIG. 7, is performed, it is to be noted that the registration or updating of system data pertinent to the hardware or software with this displayed list as a starting point is performed in similar manner.

First Variant

In the above-described embodiment, a registration screen for individual system data is invoked to register or update the system data. However, as an operator performs the operation of setting and changing a number of times and becomes well-versed in the registering operation, he or she may feel troublesome the operation of invoking the registration picture 331 shown in FIG. 11 to register the system data, then reverting to a display screen indicating the set of folders of the same group as the SDID, selecting the folder for the other SDID and invoking a new registration picture 331. Since the registration picture 331 is displayed, the operation would be higher in efficiency if registration of other system data can be completed simultaneously by a minimal change of the displayed picture.

Figure 13:
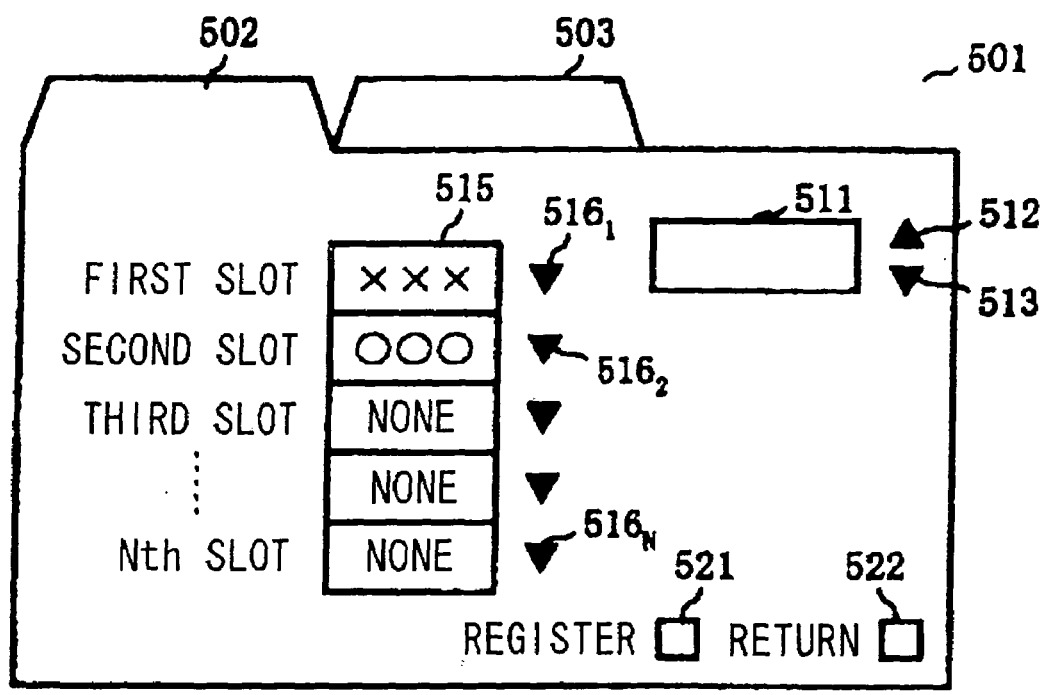
FIG. 13 is a plan view showing essential portions of a display showing a typical registration picture in a first modification of the present invention.

FIG. 13 shows an example of a registration picture for satisfying this request. Similarly to the registration screen 331, this registration picture 501 is a picture used for setting variable system data. However, with this registration picture 501, it is possible to select system data that can be registered in this picture. To this end, plural folders for registration of system data, such as a folder 502 for system data registration, namely the registration of the hardware (H/W) and a folder 503 for registration of system data, such as for registration of a button for a telephone set, are demonstrated on the registration picture 501 (see FIG. 3). In these folders 502, 503 for registration of system data, variable settings can be made by pointing the folders with a pointing apparatus, such as a mouse, not shown, for demonstrating one of the folders on the foreground of the display. In the example shown in FIG. 13, the hardware registration operations are enabled to be performed as a result of demonstrating the folder on the foreground of the display.

It is assumed that an operator selects a group "H/W for ISDN network" and performs an operation of setting system data for inserting the first $SDID_1$ into the second slot of the second unit. It is also assumed that the operator has invoked the registration picture 501. In such case, the system data setting operation of inserting the inherent first $SDID_1$ into the second slot of the second unit is carried out. On the registration picture 501, there is provided a selected unit display column 511, as in the previous embodiment. A countup button 512 for incrementing the unit number and a countdown button 513 for decrementing the unit number are arranged in the vicinity of the selected unit display column 511. On the left side of the selected unit display column 511, there is provided a hardware display column 515 of first to nth slots. On the right side of the corresponding slots in the hardware display column 515 are arranged pulldown menu display buttons $516_1, 516_2 \ldots 516_N$. A registration button 521 and a return button 522 are arranged in the vicinity of the lower end of the folder 502 for system data registration.

An operator first selects the folder 502 for system data registration and displays in on the foreground. The operator then acts on the countup button 512 or the countdown button 513 to display the "second unit" on the display column 511. In order to make setting for inserting the hardware (substrate), that is the "H/W for ISDN network", into the second unit, a pulldown menu display button $516_2$ for the targeted second slot is clicked with a mouse button.

Figure 14:
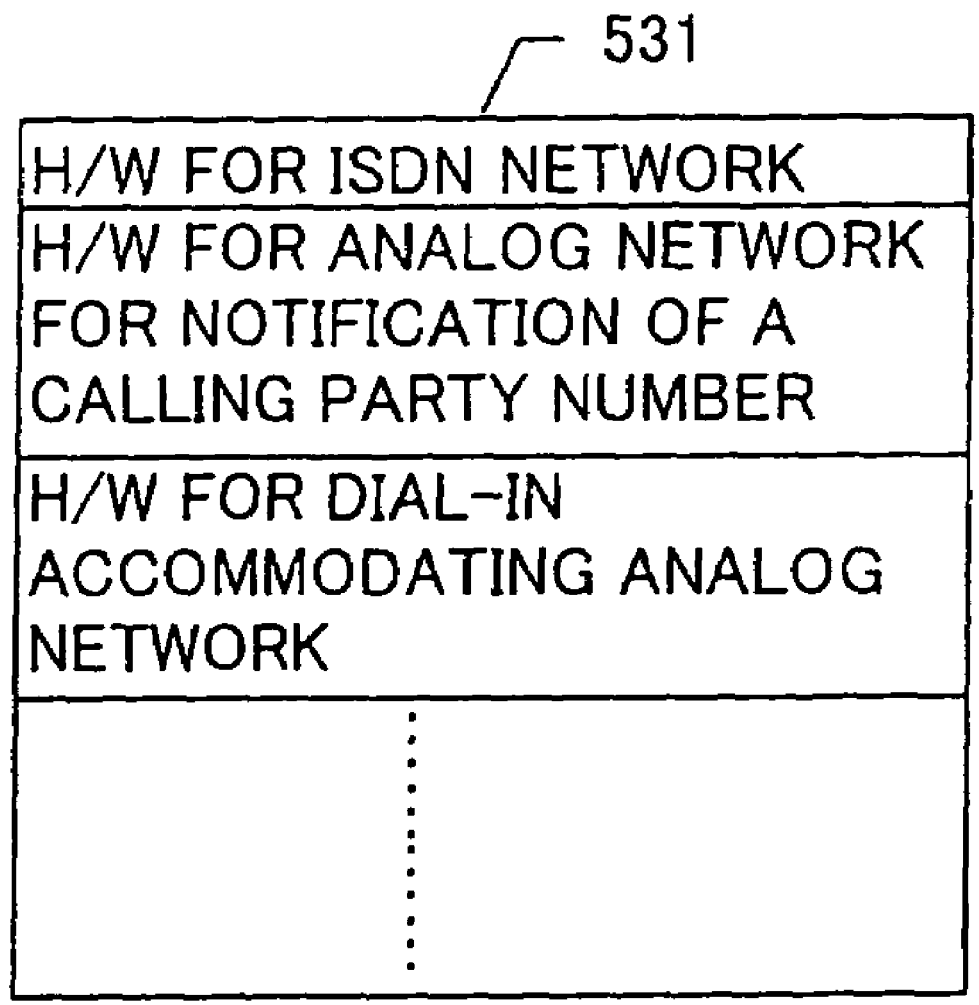
FIG. 14 is a plan view showing a typical pulldown menu displayed on clicking a pulldown menu display button in the first modification.

FIG. 14 shows an example of a pulldown menu displayed on clicking the pulldown menu display button. Since a variety of the hardware shown in FIG. 4 is demonstrated in a window 531 representing the pulldown menu, the operator selects a desired hardware, herein "H/W for ISDN network", and pushes a registration button 521 in the folder 502 for system data registration in the registration picture 501 to complete an operation for system data registration.

Meanwhile, in the hardware display column 515 of the present first embodiment, the demonstration "none" is made as from the third slot on. This indicates that only the first and second slots are present in the second unit. It may occur that a certain operator is desirous of setting system data for the first slot not set for the second unit. In such case, it suffices to select a pulldown menu display button $516_1$ for the first slot with a mouse to demonstrate the window 531 shown in FIG. 14 as before, to select the desired hardware thereon and to push the registration button 521.

If, for example, "button registration for a telephone apparatus" is to be achieved on the same picture in addition to "H/W registration", a folder 503 for system data registration, termed button registration for a telephone apparatus, is selected and an operation similar to that for the folder 502 is performed to achieve the registration operation for plural system data on the sole registration picture 501.

Second Variant

In the above-described embodiment and the first variant, data is transferred from the system data registration terminal 102 shown in FIG. 1 to the main body portion 101 on the system data basis each time the system data is to be set. The main body portion 101 is also performing control as the usual telephone apparatus, except when newly installing a multi-functional telephone apparatus, such that the function as the telephone apparatus is not halted only during setting of the system data. Simply, the control on the hardware to be set or the software is not performed until completion of the setting or control is performed in the pre-setting state until the setting comes to a close. However, the fact that data for setting or changing the system data is intermittently sent from the system data registration terminal 102 means that these data need to be processed batch-wise to render the efficient control difficult. So, in the second variant, setting or changing data are transmitted from the system data registration terminal 102 at a time to the main body portion 101 at a time point of completion of a sequence of processing on the data.

The present multi-functional telephone apparatus uses a system data changing terminal of the circuit configuration which is the same as that of the previous embodiment. However, this system data change terminal is provided with a non-volatile memory of a relatively large capacity in addition to a RAM (random access memory) as a usual work memory. As this non-volatile memory, a RAM backed up by a battery may be used. If a personal computer serves as the system data changing terminal, a hard disc of the personal computer or an external storage medium, such as an optical disc, may also be used. In the present variant, the entire data pertinent to the setting or changing of the system data transmitted last time to the main body portion 101 is stored in this non-volatile memory.

Figure 15:
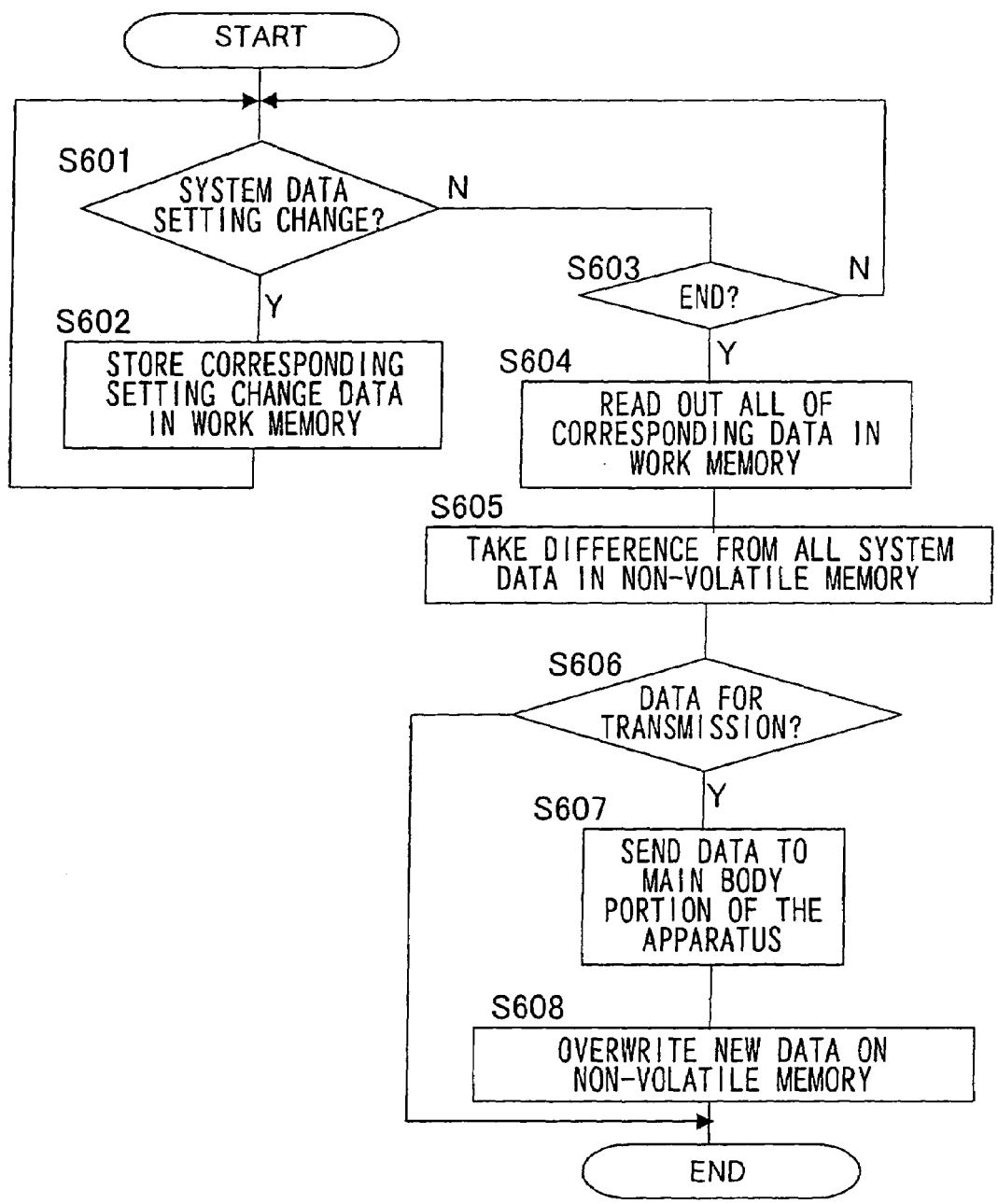
FIG. 15 is a flow diagram showing schematics of data processing performed on the side of the system data change terminal until transmission of system data in the second modification of the present invention.
Figure 16:
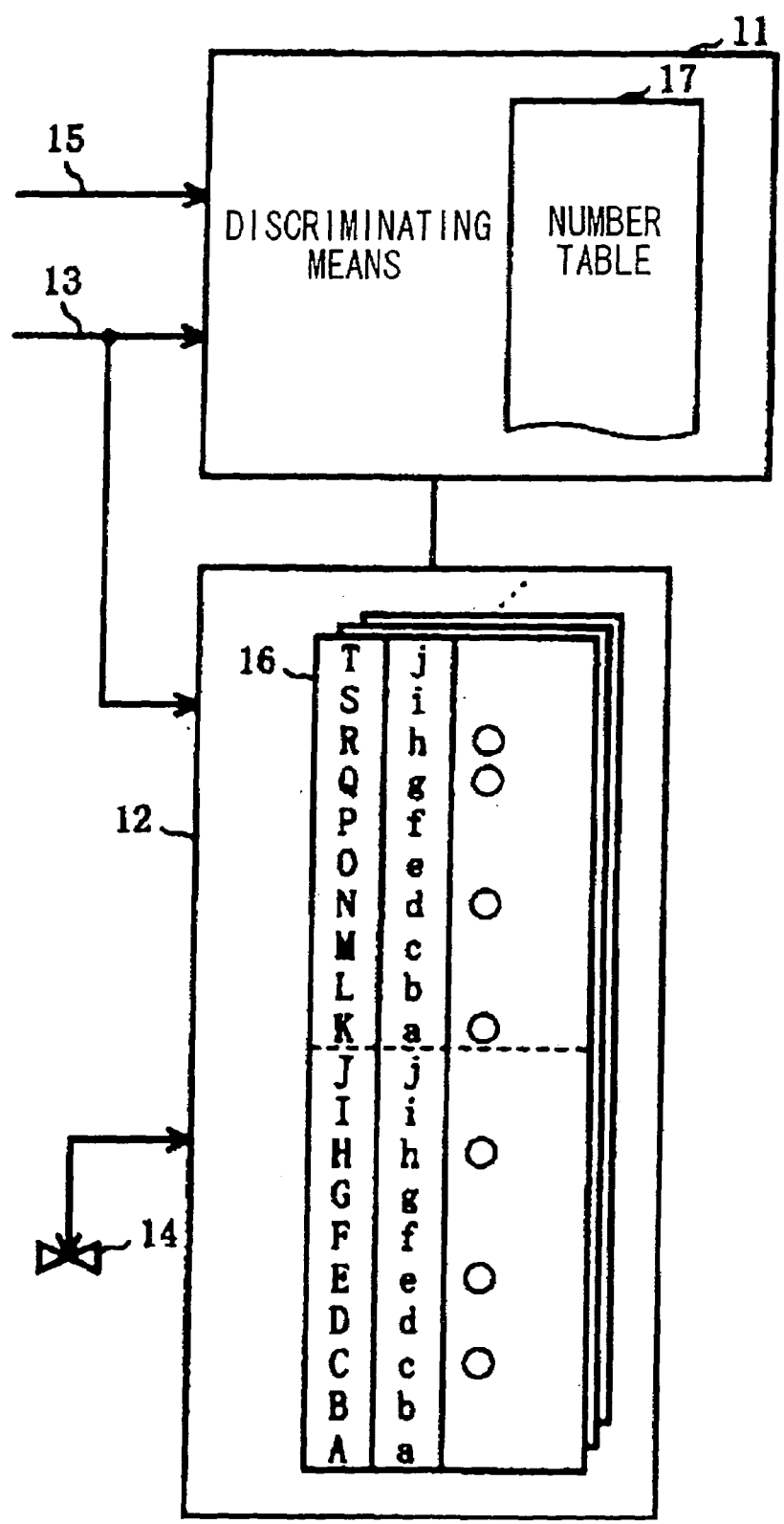
FIG. 16 is a block diagram showing schematics of a typical conventional multi-functional telephone apparatus.
Figure 17:
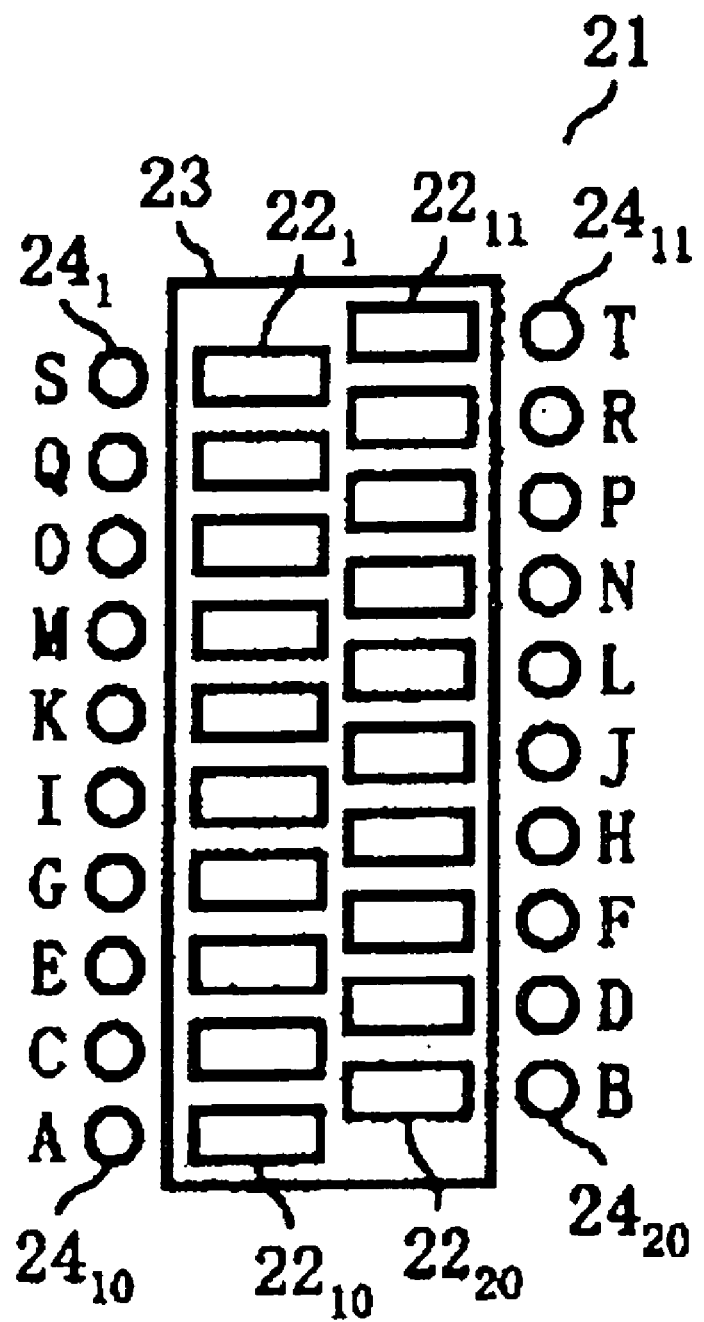
FIG. 17 is a plan view showing a typical display of a button telephone set connected to the multi-functional telephone apparatus shown in a proposal of FIG. 16.
Figure 18:
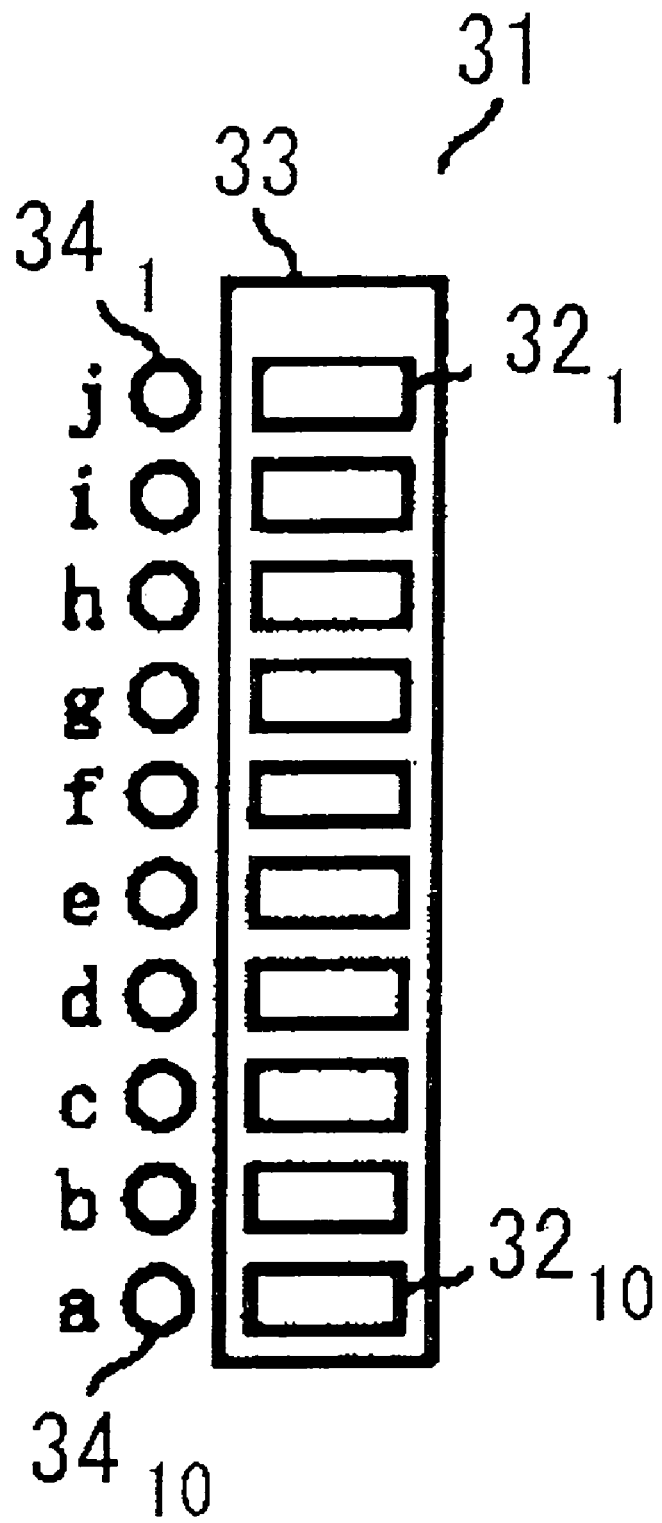
FIG. 18 is a plan view showing another typical display of a button telephone set connected to the multi-functional telephone apparatus shown in a proposal of FIG. 16.
Figure 19:
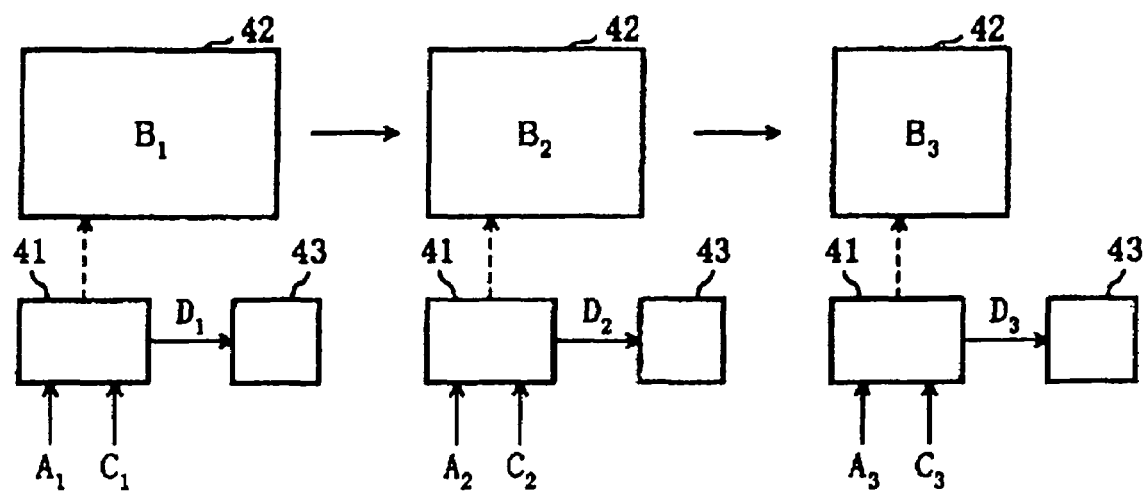
FIG. 19 illustrates the manner of setting system data in another multi-functional telephone apparatus proposed previously.

FIG. 15 shows the status of the data processing in the system data changing terminal until transmission of system data in the second variant of the present invention. In the system data changing terminal, data pertinent to the relevant setting change is stored in the work memory (step S602) each time the setting or change of the individual system data comes to a close (step S601: Y). That is, the data is not transmitted to the main body portion 101 batch-wise.

When the setting or changing of the sequence of system data comes to a close and an operator clicks a system data setting or change end button, not shown (step S603: Y), the system data change terminal reads out the entire data for setting or changing the system data now stored in the work memory (step S604). The difference between the system data 13 now stored and the previously stored data is taken to prepare difference data (step S605). If there is no previously stored data, the entire data now stored is the difference data. If this difference data is not significant as data, that is if an operator has commanded the end of the operation without setting or changing the system data (step S606: N), the sequence of operations is terminated without data being re-transmitted to the main body portion 101 (end).

If conversely there is data to be transmitted as difference data (step S606: Y), only the produced difference data is transmitted to the main body portion 101 (step S607). Since the difference data is data of difference of system controlling data currently set in the main body portion 101, data transfer time is usually reduced significantly. When transmission of difference data comes to a close, the new entire data after the current setting change is overwritten on the entire system data stored in the non-volatile memory (step S608). Of course, the contents of the overwritten data coincide with those of the latest post-change data of the main body portion 101. The data transmitting operation to the main body portion 101 can be diminished in this manner to improve the efficiently in the processing operation to be performed by the main body portion 1.

Meanwhile, in the second variant, data is transmitted to the main body portion 101 after the entire operation for setting or changing the system data by the system data changing terminal comes to a close. Thus, in the stage prior to this transmitting operation, it is not necessary for the system data changing terminal to be connected to the main body portion 101. On the other hand, although the difference data is transmitted at a time in the second variant, the entire data set or changed may be transmitted at a time without taking the difference.

In the above-described embodiment, the contents of the folder displayed are switched over by selecting the folder tab. However, it is of course possible to use a scroll bar or a pulldown menu for switching-over, or to provide a switching button to switch over the display contents.

Although the multi-functional telephone apparatus is taken as an example in the above-described embodiment and modifications, it should be noted that the present invention may similarly be applied to other routine electronic apparatus.

The meritorious effects of the present invention are summarized as follows.

According to the first aspect, as described above, respective setting data used in doing various settings for an electronic apparatus are collected together in plural groups on the basis of pre-set concepts, these plural groups are collected together (classified) to a selection item on the basis of a concept representing an upper order concept of the groups, there being provided a plurality of sets of different ones of the selection items as an upper order concept and different ones of the preset concepts as a lower order concept under the condition of common individual setting data, and links from the selection items to the individual setting data are stored in the storage unit from one selection item to another. It is therefore possible for an operator to trace a path to the same setting data along optimum alternatives of a tree structure constructed on the basis of different concepts. In this manner, the operator is able to perform an operation with high efficiency and operability in meeting with an environment etc. in which the operator is placed in connection with data setting.

According to the second to eighth aspects, as described above, respective system data used in doing various settings for a multi-functional telephone apparatus are collected together in plural groups on the basis of pre-set concepts, these plural groups are collected together to a selection item on the basis of a concept representing an upper order concept of the groups, there being provided a plurality of sets of different ones of the selection items as an upper order concept and different ones of the preset concept as a lower order concept under the condition of common individual system data, and links from the selection items to the individual system data are stored in a storage unit from one selection item to another. It is therefore possible for an operator to trace a path to the same system data along optimum alternatives of a tree structure constructed on the basis of different concepts. In this manner, the operator is able to perform an operation with high efficiency and operability in meeting with an environment etc. in which the operator is placed in connection with data setting.

According to the fifth aspect, certain ones of plural system data are collected together into a sub-group from the standpoint of functions, so that it is possible to register these system data collectively. Moreover, if the same sub-group is used in other portions of the multi-functional telephone apparatus, designing management is facilitated for the designer of the multi-functional telephone apparatus.

According to the sixth aspect, the system data setting unit in the multi-functional telephone apparatus of the second aspect includes a group displaying unit displaying a group relevant to a selected selection item, a system data selection unit selecting individual system data from the group displayed by the group displaying unit, a system data setting unit setting system data selected by the system data selection unit, and a system data registration unit registering the system data as set in a system data registration area used as a reference in the operation of a apparatus. Thus, the contents of the system data can be set efficiently in a clear wasteless fashion by selecting the system data based on the optimum selection item, group and optimum concept under an existing environment of the operator.

According to the seventh aspect, the system data registration area is arranged on the main body portion of the apparatus having the function of the telephone set. The registration operation is carried out on connecting the system data registration terminal to the main body portion of the apparatus. This enables a system data registration terminal, such a personal computer, to be connected to the main body portion of the apparatus to perform the registration operation to simplify the circuitry of the main body portion of the apparatus as well as to relieve the load otherwise on the main body portion of the apparatus due to the presence of the system data registration terminal. The system data registration terminal is used in common by the computer, telephone set or a variety of information terminals to provide for an economic structure of the entire system.

According to the eighth aspect, the system data registration terminal has an area in which to store the same data as the system data registered in the system data registration area in the main body portion of the apparatus, so that, by having data for system management belonging to the main body portion of the apparatus held therein, backup data can be held to improve reliability of the multi-functional telephone apparatus.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A multi-functional telephone apparatus comprising:
   (a) a storage unit configured for
      (a1) a system data table for storing a list of system data which is used for individual functional setting of the multi-functional telephone apparatus as individual setting data,
      (a2) a function-classified system data table for storing a list of a plurality of groups formed by classifying said system data into respective groups according to the function, and
      (a3) a hardware-classified system data table for storing a list of a plurality of groups formed by classifying said system data into respective groups according to hardware making up the multi-functional telephone apparatus,
   (b) a selection item selection unit configured for selecting one of a plurality of selection items in said storage unit displayed collectively wherein said system data table, said function-classified system data table, and said hardware-classified system data table serve as selection items, and
   (c) a system data setting unit configured for enabling setting of individual system data belonging to a displayed group by displaying the group belonging to a selection item when one of said selection items is selected by said selection item selection unit, said system data setting unit comprising:

a group displaying unit configured for displaying a group relevant to a selected selection item, a system data selection unit configured for selecting individual a system data from the group displayed by said group displaying unit, a system data setting unit configured for setting system data selected by said system data selection unit, and a system data registration unit configured for registering the system data as set in a system data registration area used as a reference in the operation of an apparatus, wherein said system data registration area is arranged on a main body portion of the apparatus having a function of a telephone set and wherein said system data setting unit excluding the system data registration area, said storage unit and the selection item selection unit are arranged on the side of a system data registration terminal removably arranged on said main body portion, said system data registration terminal has an area for storage of the same data as the system data registered in the system data registration area, and wherein when system data newly set or changed is routed to the system data registration area, a difference thereof from data already registered in said system data registration area is determined and the resulting difference data is sent to said main body portion.

* * * * *